(12) United States Patent
Choi

(10) Patent No.: US 11,721,466 B2
(45) Date of Patent: Aug. 8, 2023

(54) INNER PLUNGER OF SOLENOID ASSEMBLY FOR DIFFERENTIAL CLUTCH OF VEHICLE AND MANUFACTURING METHOD THEREOF

(71) Applicant: Byoung Sun Choi, Daegu (KR)

(72) Inventor: Byoung Sun Choi, Daegu (KR)

( * ) Notice: Subject to any disclaimer, the term of this patent is extended or adjusted under 35 U.S.C. 154(b) by 142 days.

(21) Appl. No.: 17/181,478

(22) Filed: Feb. 22, 2021

(65) Prior Publication Data

US 2022/0270801 A1    Aug. 25, 2022

(51) Int. Cl.
| | |
|---|---|
| *H01F 7/16* | (2006.01) |
| *F16H 48/34* | (2012.01) |
| *F16H 48/24* | (2006.01) |
| *H01F 7/08* | (2006.01) |
| *F16D 27/118* | (2006.01) |

(52) U.S. Cl.
CPC ........... *H01F 7/1607* (2013.01); *F16H 48/24* (2013.01); *F16H 48/34* (2013.01); *H01F 7/081* (2013.01); *F16D 27/118* (2013.01)

(58) Field of Classification Search
CPC ........ H01F 7/081; H01F 7/1607; F16H 48/24; F16H 48/34; F16D 27/118
See application file for complete search history.

(56) References Cited

U.S. PATENT DOCUMENTS

| | | | | |
|---|---|---|---|---|
| 3,854,562 A | * | 12/1974 | Wilczewski | .......... F16D 27/112 192/84.961 |
| 4,271,722 A | | 6/1981 | Cambell | |
| 4,281,264 A | * | 7/1981 | Keim | ........................ H02K 3/47 174/DIG. 20 |
| 6,129,194 A | * | 10/2000 | Booth | ................... F16D 27/112 192/84.961 |
| 6,194,803 B1 | * | 2/2001 | Heim | .................... F16D 27/112 192/84.941 |
| 6,945,895 B2 | * | 9/2005 | Fusegi | ..................... F16H 48/08 192/84.92 |
| 7,284,978 B2 | * | 10/2007 | Manda | ..................... B29C 45/52 251/297 |
| 7,887,450 B2 | * | 2/2011 | Fusegi | .................... F16H 48/34 192/84.96 |
| 8,808,127 B2 | * | 8/2014 | Seidl | ....................... F16D 11/00 475/231 |

(Continued)

FOREIGN PATENT DOCUMENTS

KR            101660641         9/2016

*Primary Examiner* — Matthew W Jellett
(74) *Attorney, Agent, or Firm* — IPLA P.A.

(57) ABSTRACT

An inner plunger of a solenoid coil assembly for a differential clutch of a vehicle contributes to weight lightening and price reduction of a solenoid assembly, provide various shapes, reduce friction against an inner housing, and improve the function of the solenoid assembly. The inner plunger includes an outer wheel combined with a coil bobbin of a solenoid assembly and an inner wheel combined with an inner housing. The inner wheel is molded of insulator synthetic resin with excellent moldability, magnetic metal as the outer wheel is inserted into the outer circumferential surface of the inner wheel made of the synthetic resin, a retaining groove formed in the outer wheel is filled with the synthetic resin of the inner wheel, and a support piece formed on the inner wheel supports the outer wheel.

2 Claims, 7 Drawing Sheets

(56) References Cited

U.S. PATENT DOCUMENTS

| | | | |
|---|---|---|---|
| 9,396,860 B1* | 7/2016 | Wright | F16D 27/118 |
| 10,995,803 B2* | 5/2021 | Moore | F16D 27/102 |
| 2016/0245345 A1* | 8/2016 | Miki | F16D 13/76 |

* cited by examiner

INNER PLUNGER OF SOLENOID ASSEMBLY FOR DIFFERENTIAL CLUTCH OF VEHICLE AND MANUFACTURING METHOD THEREOF

BACKGROUND

The present invention relates to an inner plunger of a solenoid coil assembly for a differential clutch of a vehicle and a manufacturing method thereof, and more particularly, to an inner plunger of a solenoid coil assembly for a differential clutch of a vehicle and a manufacturing method thereof, which can improve quality and productivity and lighten weight.

As is well known, a differential of a vehicle is configured to differentially distribute the driving force of an engine according to resistance applied to both wheels, and a differential case is rotatably installed inside a carrier. A spyder having a pinion and side gears geared at both sides of the pinion are installed inside the differential case, and the side gears and hubs of the wheels are connected to a drive shaft, so that engine power is transmitted.

A solenoid assembly functioning to operate a clutch of the differential of the vehicle actuates an outer plunger and an inner plunger or a piston using a magnetic force generated from a coil assembly therein in order to connect or separate a differential gear locking device.

Now, a configuration of the conventional inner plunger constituting the solenoid assembly for the differential clutch having the above-mentioned action will be described. An inner wheel of the inner plunger closely meshed to an inner housing is made of stainless steel to move regardless of the magnetic force, and an outer wheel is made of magnetic metal to form an electromagnetic force of a coil.

In order to prevent an influence of the magnetic force on the inner wheel and to form the magnetic force on the outer wheel, different metals are welded together, and the welded metals are processed precisely through a precision machining process with various steps, so a manufacturing price is expensive.

Especially, since the inner wheel and the outer wheel of the inner plunger are all made of metal, the inner plunger is very heavy.

Therefore, the conventional inner plunger has several disadvantages in that it goes against weight reduction of vehicles and deteriorates the function of the solenoid assembly, and in that there are many problems in the structure of the inner plunger since the inner plunger is limited in its shape due to a bad moldability if it is made of stainless steel.

Korean Patent Publication No. 10-1983-0003671 (published on Jun. 22, 1983)

Korean Patent No. 10-1660641 (registered on Sep. 21, 2016)

SUMMARY OF THE INVENTION

Accordingly, the present invention has been made to solve the above-mentioned problems occurring in the prior arts, and it is an object of the present invention to provide an inner plunger of a solenoid coil assembly for a differential clutch of a vehicle, which can contribute to weight lightening and price reduction of a solenoid assembly, provide various shapes, and improve the function of the solenoid assembly by reducing friction against an inner housing.

To accomplish the above object, according to the present invention, there is provided an inner plunger of a solenoid coil assembly for a differential clutch of a vehicle including an outer wheel combined with a coil bobbin and an inner wheel combined with an inner housing.

The inner wheel of the inner plunger is molded with insulator synthetic resin with excellent moldability, and magnetic metal as the outer wheel is inserted into the outer circumferential surface of the inner wheel made of the synthetic resin.

The outer wheel made of metal includes three or more retaining grooves, each of which an entrance is narrow and the inside gets wider, to be firmly combined with the inner wheel made of the insulator synthetic resin. The retaining grooves are filled with synthetic resin forming the inner wheel, and a support piece formed integrally with the inner wheel is integrated with a lower end of the outer wheel.

An undercut groove is formed between upper and lower support parts on the inner surface of the inner wheel made of synthetic resin in order to reduce friction against an inner housing.

In another aspect of the present invention, there is provided a manufacturing method of an inner plunger of a solenoid assembly for a clutch is to injection-mold by a mold. The mold includes: a mold body having a space for inserting the outer wheel of the inner plunger, a support jaw formed at a lower portion of the space to support a lower end of the outer wheel, a space for forming a support piece formed integrally with the inner wheel, and a space for molding the inner wheel; and a core having an undercut molding part for forming an undercut groove between upper and lower support parts of the inner wheel in order to reduce friction against the inner housing.

The manufacturing method of an inner plunger includes the steps of: putting an outer wheel made of magnetic metal in the space of the mold body for inserting the outer wheel of the inner plunger so that the lower end of the outer wheel comes into contact with the support jaw; combining the core having the undercut molding part with the middle of the mold body; and forming the inner wheel with nonmagnetic synthetic resin by injection-molding.

The inner plunger constituting the solenoid assembly according to the present invention can contribute improvement of productivity and price reduction of the solenoid since having the inner wheel made of synthetic resin and the outer wheel made of magnetic metal.

Especially, the inner plunger according to the present invention can contribute to improvement of the quality of the solenoid assembly since the inner wheel and the outer wheel are firmly combined with each other by the retaining groove formed on the outer wheel and the support piece formed on the inner wheel.

Moreover, the inner plunger according to the present invention can provide various shapes of the inner plunger and reduce weight since the inner wheel is injection-molded, and slide smoothly since reducing a friction force against the inner housing.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
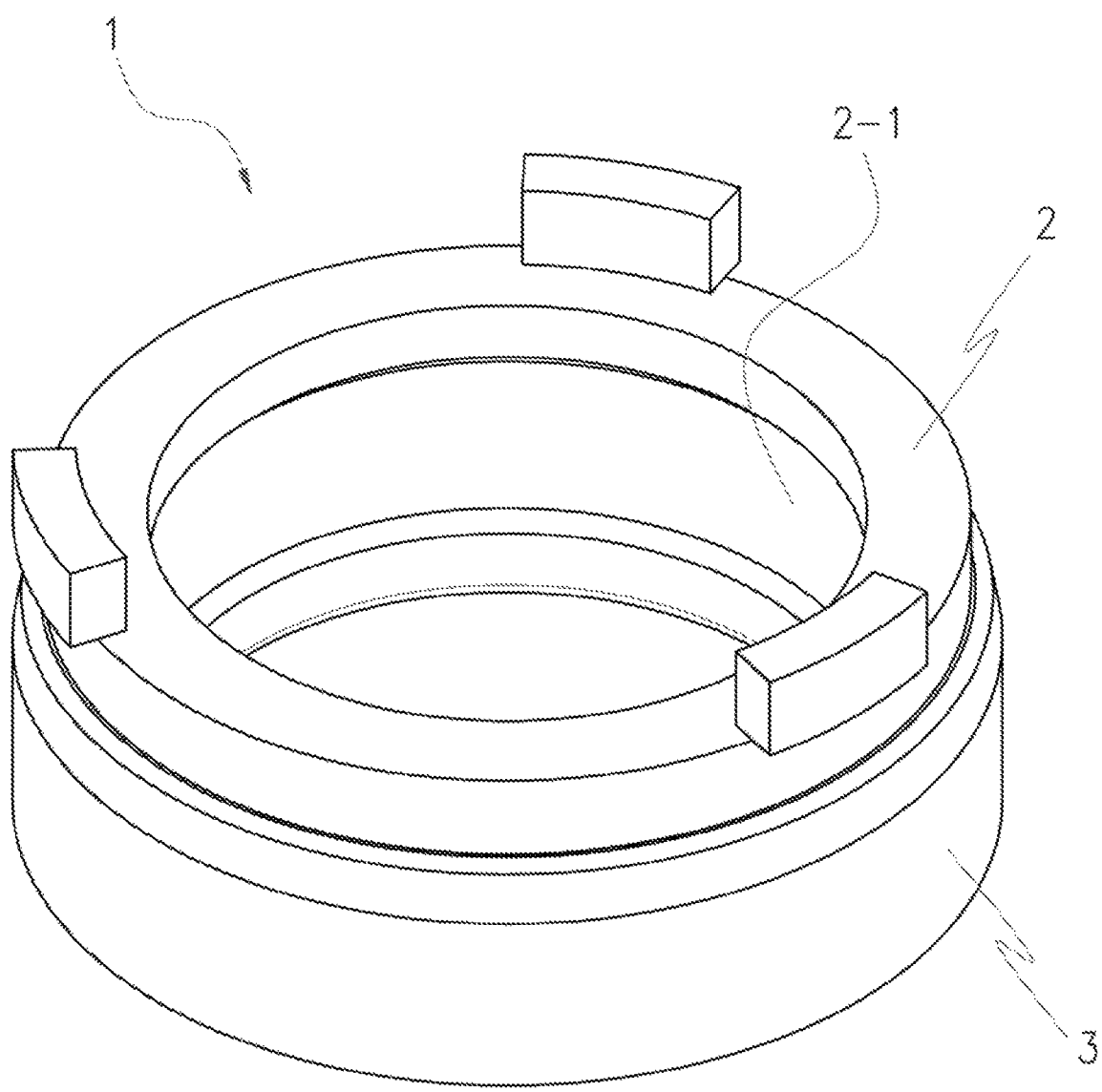
FIG. 1 is a perspective view showing an inner plunger according to the present invention.
Figure 2:
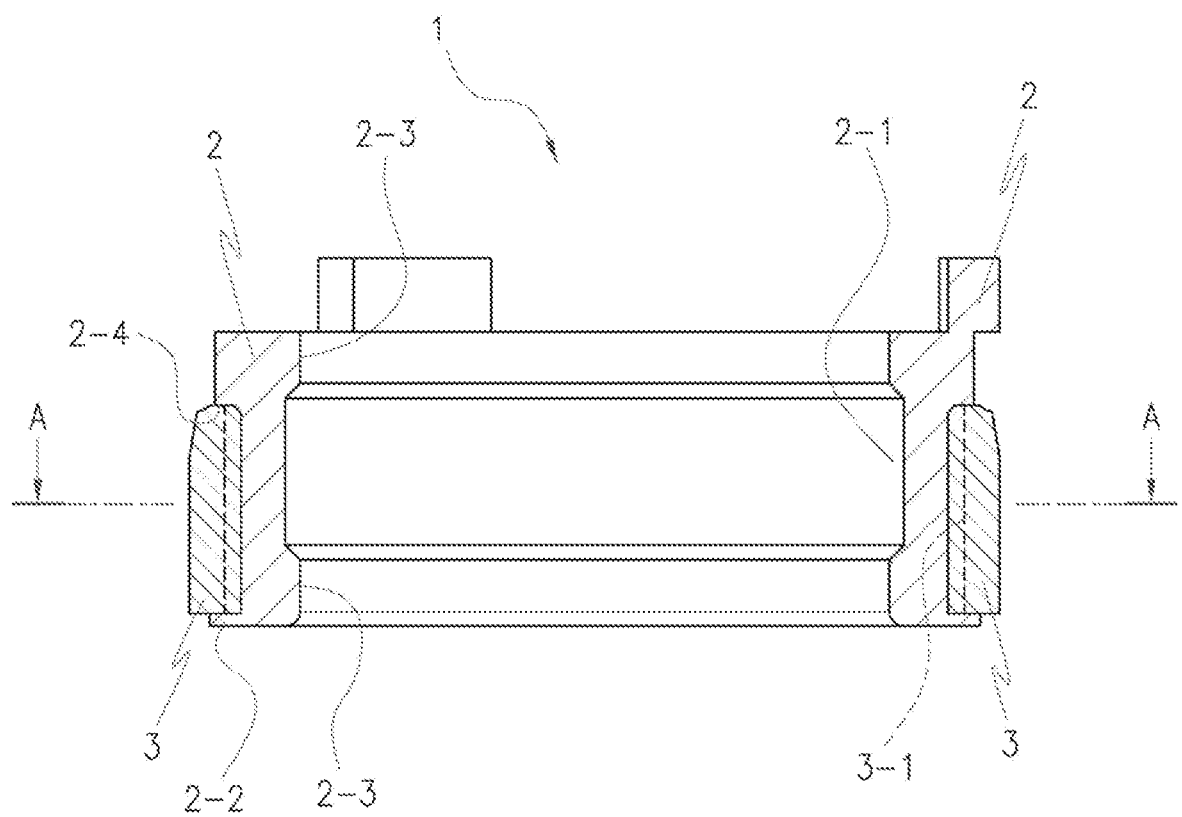
FIG. 2 is a sectional view showing the inner plunger according to the present invention.
Figure 3:
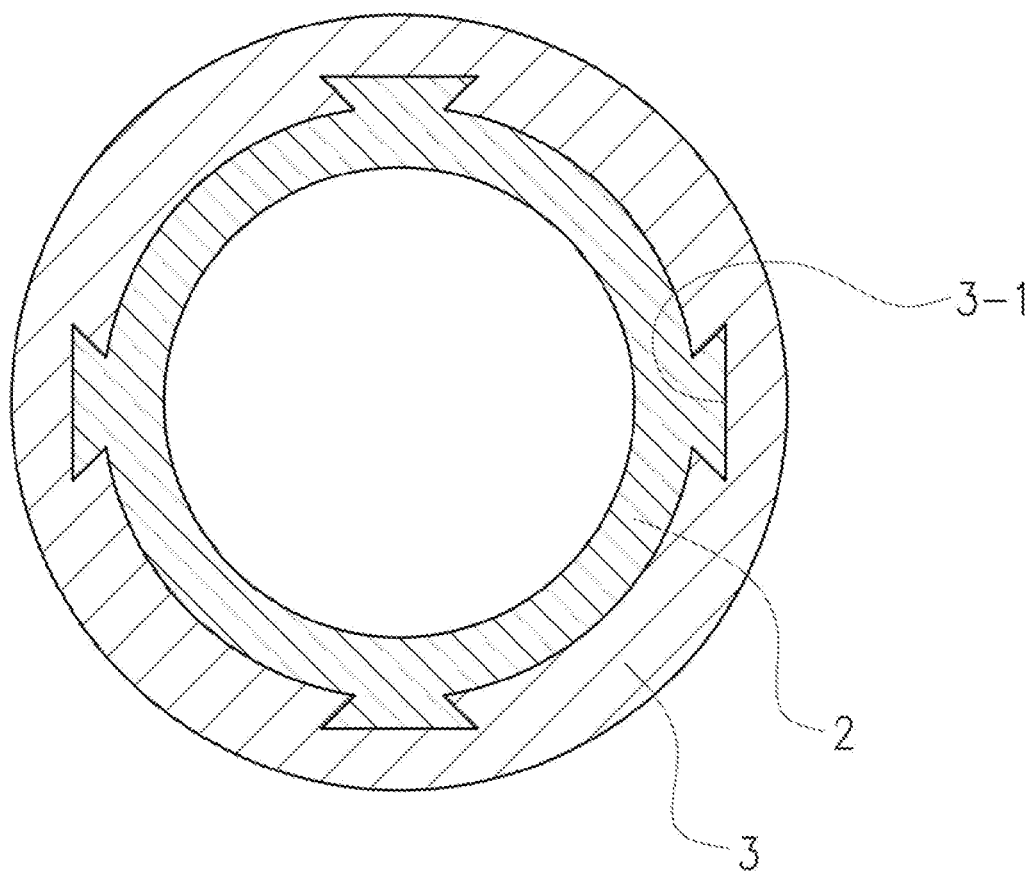
FIG. 3 is a sectional view taken along the line of A-A of FIG. 2.
Figure 4:
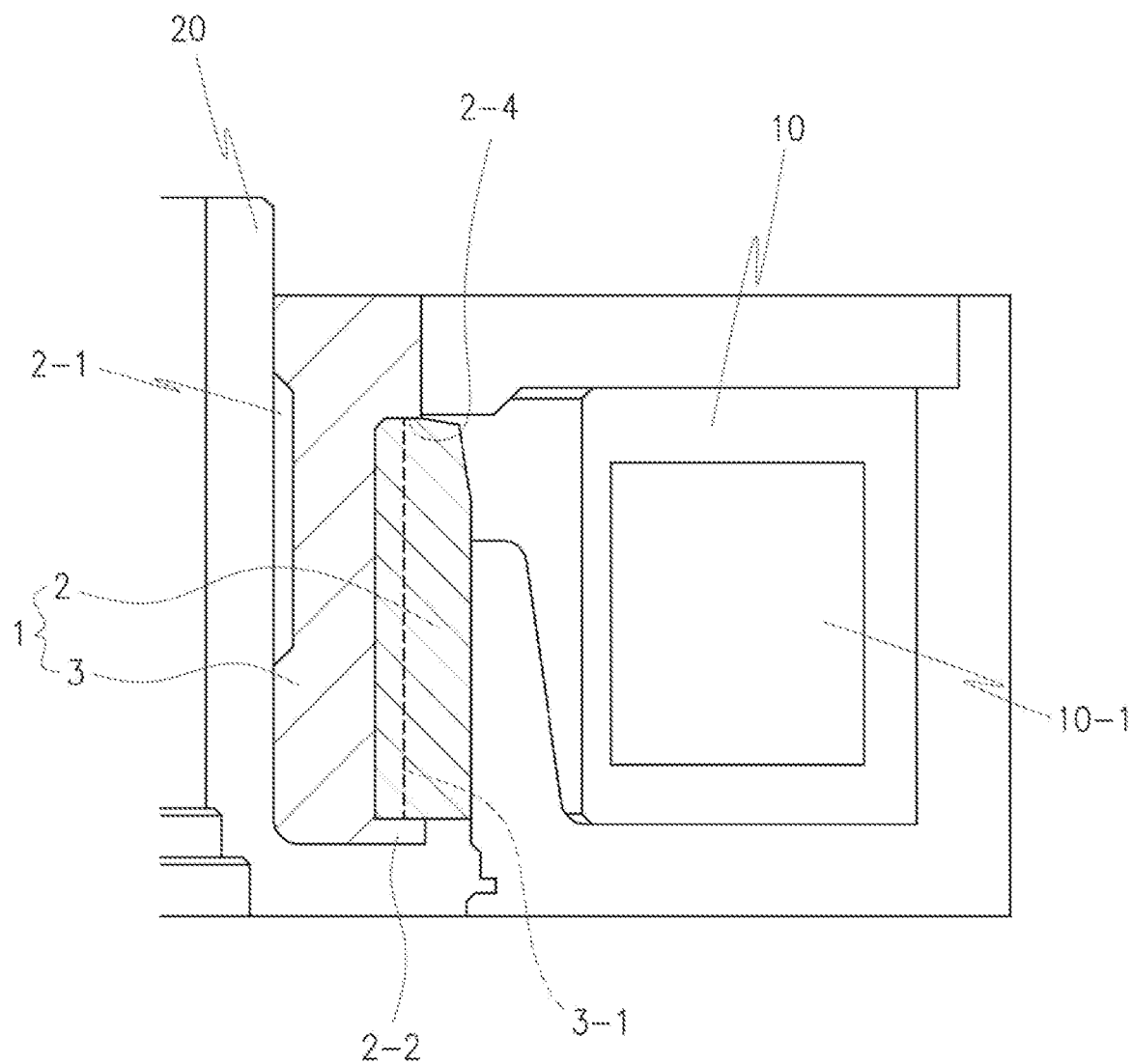
FIG. 4 is a partially sectional view of a solenoid assembly in which the inner plunger according to the present invention is installed.

Hereinafter, example embodiments of an inner plunger and a manufacturing method thereof according to the present invention will be described in detail, and the example embodiments of the present invention are to realize the present invention. It should be understood, however, that the example embodiments of the present invention do not limit the technical idea of the present invention, but are to cover all modifications, equivalents, and alternatives falling within the technical idea and scope of the present invention.

Furthermore, even though actions and effects obtained by the components of the present invention are not explicitly described, it is natural that predictable effects obtained by the components of the present invention belong to the technical scope of the present invention.

With reference to the attached drawings, an inner plunger of a solenoid coil assembly for a differential clutch of a vehicle according to the present invention will be described in detail.

Referring to FIGS. 1 to 4, an inner plunger 1 of a solenoid assembly for a clutch according to the present invention includes: an outer wheel 3 constituting the solenoid assembly and combined with a coil bobbin 10 to form an electromagnetic force; and an inner wheel 2 united with the outer wheel and combined with an inner housing 20. The inner plunger reciprocates inside the inner housing 20 by the electromagnetic force formed by the coil bobbin 10.

The inner wheel 2 of the inner plunger 1 is molded with insulator synthetic resin with excellent moldability, and the outer wheel 3 made of magnetic metal is inserted into the outer circumferential surface of the inner wheel 2 made of synthetic resin as described above.

The outer wheel 3 made of metal has three or more retaining grooves 3-1 distributed at uniform angles in order to be firmly combined with the inner wheel 2 made of insulator synthetic resin. During the insertion injection-molding, the retaining grooves 3-1 are filled with synthetic resin to form the inner wheel 2.

The retaining grooves 3-1 are configured such that an entrance is narrow and the inside gets wider. When synthetic resin for forming the inner wheel 2 perfectly fills the retaining grooves 3-1, the inner wheel 2 and the outer wheel 3 are firmly coupled with each other, and it perfectly prevents generation of gaps or movement between the inner wheel 2 and the outer wheel 3 even though the synthetic resin of the inner wheel 2 is shrunk or transformed. Especially, because the entrance is narrow and the inside gets wider, such a structure can minimize generation of gaps by restraining the inner wheel 2 from being shrunk toward the center.

Additionally, when the inner wheel 2 is molded, a retaining jaw 2-4 to which an upper end of the outer wheel 3 is caught is formed, and a support piece 2-2 integrally protruding from a lower end of the inner wheel 2 is formed at a position corresponding to a lower end of the outer wheel 3, so as to support the upper and lower ends of the outer wheel 3 and prevent the outer wheel from being separated upwards and downwards.

An undercut groove 2-1 is formed between upper and lower support portions 2-3 on the inner surface of the inner wheel 2 in order to reduce friction against the inner housing.

The unexplained reference numeral 10-1 designates a coil.

A manufacturing method of the inner plunger of the solenoid assembly for the clutch according to the present invention is achieved by a mold and an insert molding.

Figure 5:
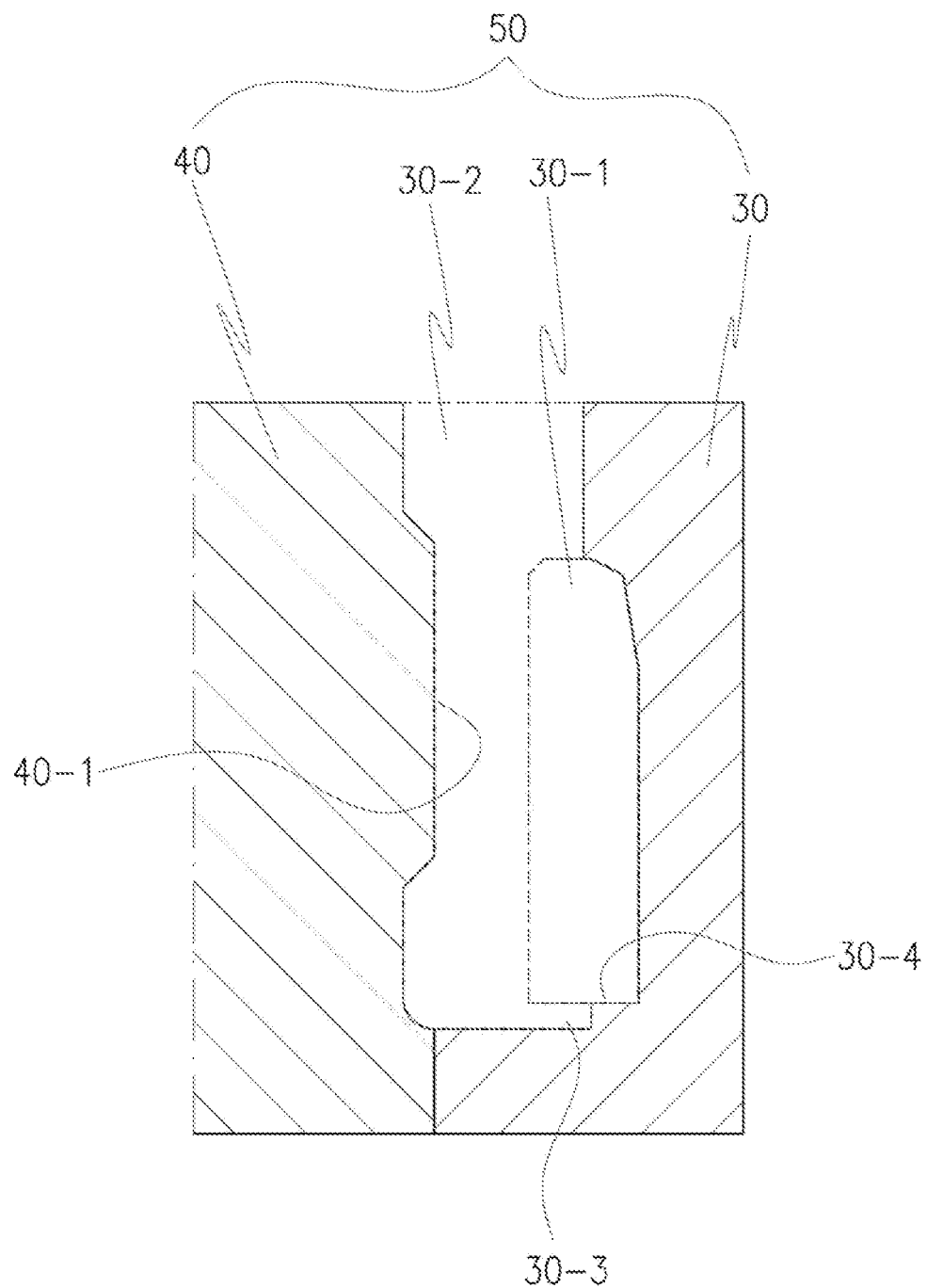
FIG. 5 is a partially sectional view of a mold for manufacturing the inner plunger according to the present invention.
Figure 6:
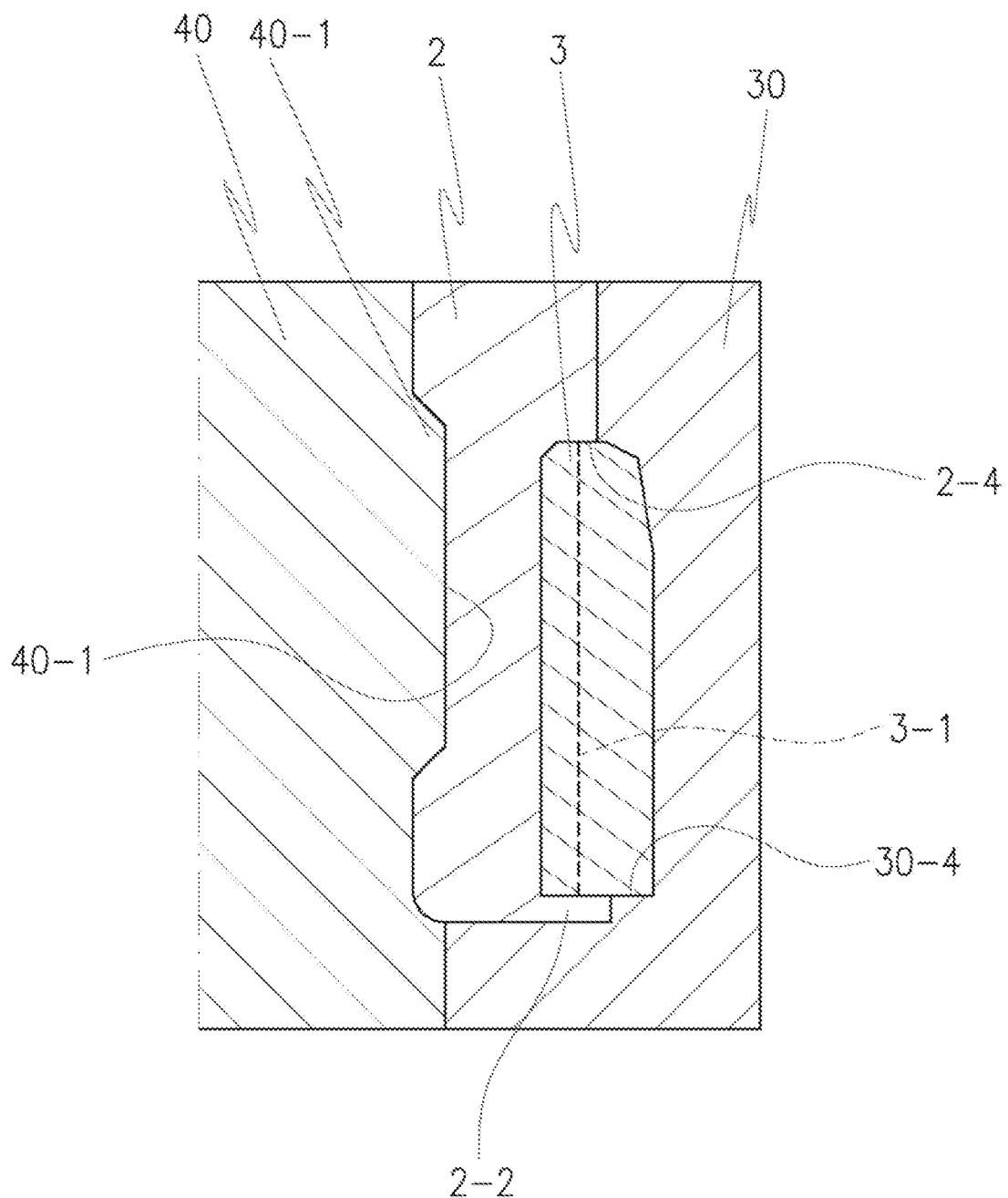
FIG. 6 is a partially sectional view showing a state where the inner plunger according to the present invention is molded.
Figure 7:
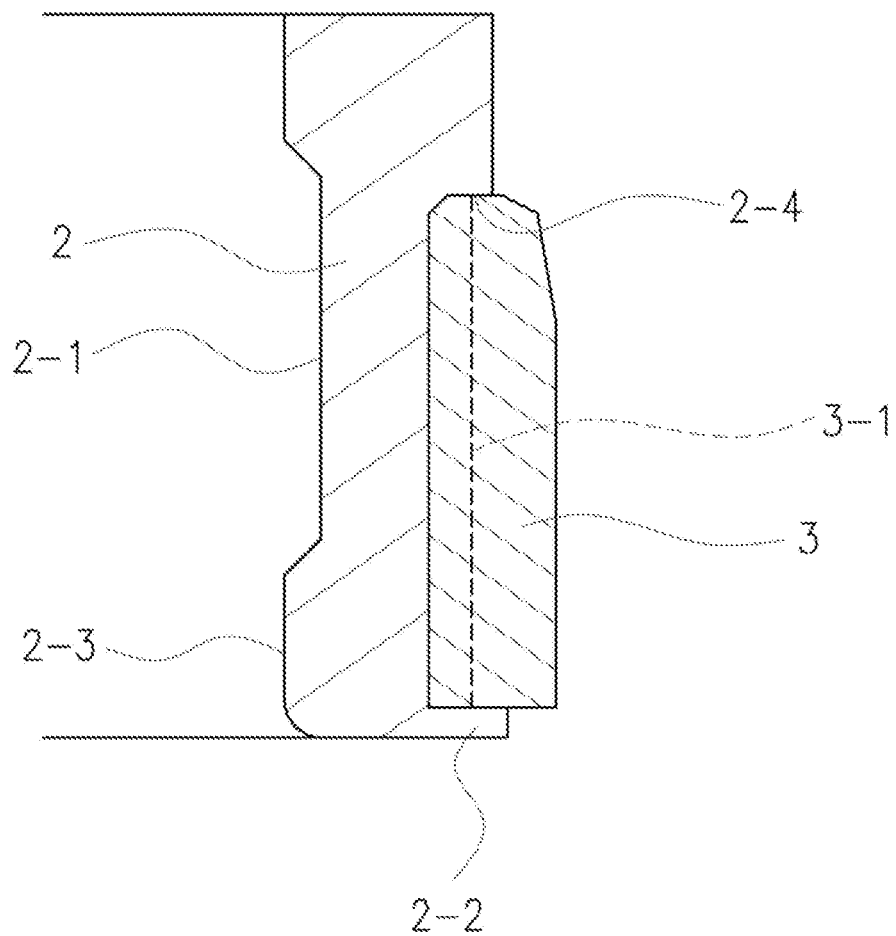
FIG. 7 is a partially sectional view showing a state where the inner plunger according to the present invention is removed from the mold.

Referring to FIGS. 5 and 6, the mold for insert molding of the inner plunger will be described.

The mold 50 includes a mold body 30 and a core 40. The mold body 30 includes: an outer wheel insertion space 30-1 for inserting the outer wheel 3 of the inner plunger; a support jaw 30-4 formed on a lower portion of the outer wheel insertion space 30-1 to support a lower end of the outer wheel 3; a support piece molding space 30-3 for forming the support piece 2-2 formed integrally with the inner wheel 2; and an inner wheel molding space 30-2 for molding the inner wheel 2 with synthetic resin. The core 40 includes an undercut molding part 40-1 through which the undercut groove 2-1 is formed between the upper and lower support portions 2-3 of the inner wheel 2 in order to reduce friction against the inner housing.

The outer wheel 3 made of magnetic metal is inserted into the mold 50, and then, is molded to be inserted while the inner wheel 2 is molded with synthetic resin.

In detail, the outer wheel 3 made of magnetic metal is inserted into the outer wheel insertion space 30-1 of the mold body 30 till the lower end of the outer wheel comes into contact with the support jaw 30-4, the core 40 having the undercut molding part 40-1 is combined with the middle of the mold body 30, and then, injection molding is performed by a catapult.

The inner wheel 2 is formed with nonmagnetic synthetic resin is formed by injection molding. After that, the inner plunger 1 in which the outer wheel 3 made of magnetic metal is inserted is molded on the outer circumferential surface of the inner wheel 2 made of synthetic resin, and the mold is removed. Then, the inner plunger 1 is manufactured.

While the retaining groove 3-1 formed in the outer wheel 3 is filled with synthetic resin for forming the inner wheel 2, the inner wheel 2 and the outer wheel 3 are firmed combined with each other. At the same time, while the support piece molding space 30-3 formed at the lower portion of the mol body 30 is also filled with synthetic resin, the support piece 2-2 is formed integrally with the lower end of the inner wheel 2, so that insert injection is completed in the form of supporting the outer wheel 3.

Now, actions of the inner plunger of the solenoid assembly for the differential clutch of the vehicle according to the present invention will be described in detail as follows.

First, basic actions of the solenoid assembly for the differential clutch of the vehicle will be described.

The solenoid assembly is combined with the inner housing 20 of the differential of the vehicle. If it is necessary to actuate the differential, electricity is provided to the coil bobbin 10 to form an electromagnetic force.

Then, the inner plunger 1 moves along the inner housing 20 by the electromagnetic force by a magnetic field generate from the coil bobbin 10.

The above action is a general action of the solenoid assembly for the differential clutch of the vehicle. So, detailed description on the action of the solenoid assembly will be omitted, but only the actions of the components of the inner plunger will be described.

First, when the inner plunger 1 moves along the inner housing 20 by the electromagnetic force by the magnetic field generate from the coil bobbin 10, since the inner wheel 2 of the inner plunger 1 is less influenced by the electromagnetic force since being made of synthetic resin, responsibility is improved, and it helps the action that the inner plunger 1 moves along the inner housing 20.

Especially, since the undercut groove 2-1 is formed on the whole inner surface of the inner wheel 2 more simply while the inner wheel 2 is formed with the nonmagnetic synthetic resin, the inner plunger can reduce friction against the inner housing 20 when reciprocating along the inner housing 20, so that the inner plunger is free from frictional resistance and facilitates the reciprocating action along the inner housing 20.

Moreover, the inner plunger can provide various shapes due to its excellent moldability since the inner wheel 2 is made of nonmagnetic synthetic resin. Therefore, the inner plunger can improve its function and productivity according to shapes of the inner plunger.

Because the magnetic metal as the outer wheel is inserted into the outer circumferential surface of the inner wheel 2 of the inner plunger, and especially, the three retaining grooves 3-1 formed in the outer wheel 3 are filled with synthetic resin to form the inner wheel 2, it can prevent the outer wheel and the inner wheel from being separated in the diameter direction. Furthermore, because the retaining jaw 2-4 and the support piece 2-2 are formed to firmly support the upper and lower ends of the outer wheel 3, it prevents the outer wheel and the inner wheel from being separated in the axial direction so as to maintain durability for a long time.

Additionally, because the magnetic metal inserted into the outer circumferential surface of the inner wheel 2 of the inner plunger forms the outer wheel 3, it prevents a loss of the electromagnetic force generated from the coil bobbin 10, so that the inner plunger can act smoothly inside the inner housing.

What is claimed is:

1. An inner plunger of a solenoid assembly for a differential clutch of a vehicle, the inner plunger comprising an inner ring injection-molded of insulator synthetic resin with moldability and an outer ring formed on an outer circumferential surface of the inner ring, wherein the outer ring formed of metal includes three or more retaining grooves, each of which an entrance is narrow and an inside gets wider, and the three or more retaining grooves are filled with synthetic resin of the inner ring by injection so as to be firmly combined with the inner ring made of the insulator synthetic resin, and wherein upper and lower ends of the outer ring are supported by a retaining jaw for supporting the upper end of the outer ring and a support piece for supporting the lower end of the outer ring, and an under cut groove is formed between upper and lower support parts on an inner surface of the inner ring made of the synthetic resin in order to reduce friction against an inner housing.

2. A manufacturing method of an inner plunger of a solenoid assembly for a differential clutch of a vehicle comprising the steps of:

preparing a mold body, which includes an outer ring insertion space for putting an outer ring of an inner plunger, a support jaw formed at a lower portion of the outer ring insertion space to support a lower end of the outer ring, a support piece molding space for forming a support piece formed integrally with the inner ring, and an inner ring molding space for molding the inner ring with synthetic resin, and a core, which includes an undercut molding part through which an undercut groove is formed between upper and lower support portions of the inner ring in order to reduce friction against an inner housing;

putting the outer ring made of magnetic metal in the outer ring insertion space formed in the mold body in such a way that the lower end of the outer ring comes into contact with the support jaw;

combining the core having the undercut molding part with a middle of the mold body;

molding an inner plunger in which the outer ring made of the magnetic metal is inserted into an outer circumferential surface of the inner ring molded of nonmagnetic synthetic resin by injection of a catapult, filling retaining grooves formed in the outer ring with the synthetic resin for forming the inner ring so as to firmly combine the inner ring and the outer ring together, filling the support piece molding space formed at the lower portion of the mold body with synthetic resin so that a support piece is molded integrally with a lower end of the inner ring and is insert-injected to support the outer ring; and removing the inner plunger from a mold.

* * * * *